(12) United States Patent
Sugie

(10) Patent No.: US 11,315,537 B2
(45) Date of Patent: Apr. 26, 2022

(54) SILENCER

(71) Applicant: TLV CO., LTD., Hyogo (JP)

(72) Inventor: Yuichi Sugie, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 356 days.

(21) Appl. No.: 16/668,013

(22) Filed: Oct. 30, 2019

(65) Prior Publication Data

US 2020/0066244 A1 Feb. 27, 2020

Related U.S. Application Data

(63) Continuation of application No. PCT/JP2018/016960, filed on Apr. 26, 2018.

(30) Foreign Application Priority Data

May 12, 2017 (JP) .............................. JP2017-095490

(51) Int. Cl.
| | | |
|---|---|---|
| *G10K 11/16* | (2006.01) | |
| *F16L 55/045* | (2006.01) | |
| *F16T 1/38* | (2006.01) | |
| *F22D 11/06* | (2006.01) | |

(52) U.S. Cl.
CPC .......... *G10K 11/161* (2013.01); *F16L 55/045* (2013.01); *F16T 1/38* (2013.01); *F22D 11/06* (2013.01)

(58) Field of Classification Search
CPC ...... F01B 31/16; F16L 55/045; G10K 11/161; F22D 11/06
See application file for complete search history.

(56) References Cited

U.S. PATENT DOCUMENTS

| | | | |
|---|---|---|---|
| 5,304,748 A | 4/1994 | Hansen, Jr. et al. | |
| 2014/0224369 A1* | 8/2014 | Taylor .................. | F01B 31/16 138/41 |

FOREIGN PATENT DOCUMENTS

| | | | |
|---|---|---|---|
| CN | 2229818 Y | * | 6/1996 |
| CN | 2784589 Y | * | 5/2006 |
| CN | 204704538 U | | 10/2015 |
| CN | 108895423 A | * | 11/2018 |
| GB | 385599 A | | 12/1932 |
| GB | 2530282 A | | 3/2016 |
| JP | S50-55701 A | | 5/1975 |
| JP | S50-075121 U | | 7/1975 |
| JP | S55-168793 U | | 12/1980 |
| JP | S57-160513 U | | 10/1982 |
| JP | H04-126098 U | | 11/1992 |
| JP | H07-60089 A | | 3/1995 |

(Continued)

OTHER PUBLICATIONS

The extended European search report issued by the European Patent Office dated May 15, 2020, which corresponds to EP 18797908.3-1008 and is related to U.S. Appl. No. 16/668,013.

(Continued)

*Primary Examiner* — Jeremy A Luks
(74) *Attorney, Agent, or Firm* — Studebaker & Brackett PC

(57) ABSTRACT

A silencer includes a main body provided with a flow path having inlet and outlet ports of steam, configured such that the outlet port is submerged in drain, and including a submerged portion configured such that the steam contacts, in the flow path, the present drain having flowed in through the outlet port, and a porous member covering the outlet port.

5 Claims, 3 Drawing Sheets

(56) References Cited

FOREIGN PATENT DOCUMENTS

| JP | 2000-304204 | A | | 11/2000 |
|----|----|----|----|----|
| JP | 2004-190822 | A | | 7/2004 |
| JP | 2005-036900 | A | | 2/2005 |
| KR | 101097773 | B1 | * | 12/2011 |
| KR | 101339668 | B1 | | 12/2013 |

OTHER PUBLICATIONS

An Office Action issued by the China National Intellectual Property Administration on Sep. 2, 2020, which corresponds to Chinese Patent Application No. 201880029922.1 and is related to U.S. Appl. No. 16/668,013.

* cited by examiner

SILENCER

CROSS-REFERENCE TO RELATED APPLICATION

This is a continuation of PCT International Application PCT/JP2018/016960 filed on Apr. 26, 2018, which claims priority to Japanese Patent Application No. 2017-095490 filed on May 12, 2017. The disclosures of these applications including the specifications, the drawings, and the claims are hereby incorporated by reference in their entirety.

FIELD

The present application relates to a silencer configured to cause steam to contact drain.

BACKGROUND

For example, as disclosed in Japanese Patent Publication No. 50-55701, it has been known that drain generated in, e.g., a steam using instrument is recovered by a recovery pipe. In Japanese Patent Publication No. 50-55701, high-temperature drain generated due to condensation of the steam in the steam using instrument flows in the recovery pipe through, e.g., a steam trap of a branched pipe, and is recovered after having joined drain of the recovery pipe.

SUMMARY

There is a probability that impact (water hammer) is caused in the above-described recovery pipe. In some cases, part of the high-temperature drain discharged from the steam trap might be re-evaporated into steam (flash steam). When such steam flows into the recovery pipe, a relatively-large mass (space) of steam is formed in the recovery pipe. Such a steam mass is rapidly condensed due to contact with low-temperature drain, and therefore, the space where the steam is present is brought into a vacuum state at once. The drain flows into such a vacuum space at once, and due to drain collision or collision of the drain with a pipe wall, the water hammer is caused.

The technique disclosed in the present application has been made in view of such a situation, and an object of the technique is to reduce occurrence of water hammer.

A silencer of the present application includes a main body and a porous member. The main body is provided with a flow path having inlet and outlet ports of steam. Moreover, the main body has a submerged portion. The submerged portion is configured such that the outlet port is submerged in drain and the steam contacts, in the flow path, the present drain having flowed in through the outlet port. The porous member covers the outlet port.

According to the silencer of the present application, occurrence of water hammer can be reduced.

DESCRIPTION OF EMBODIMENTS

Hereinafter, an embodiment of the present application will be described with reference to the drawings. Note that the embodiment below is a preferable example in nature, and is not intended to limit a technique disclosed in the present application, an application thereof, or the scope of a use application thereof.

Figure 1:
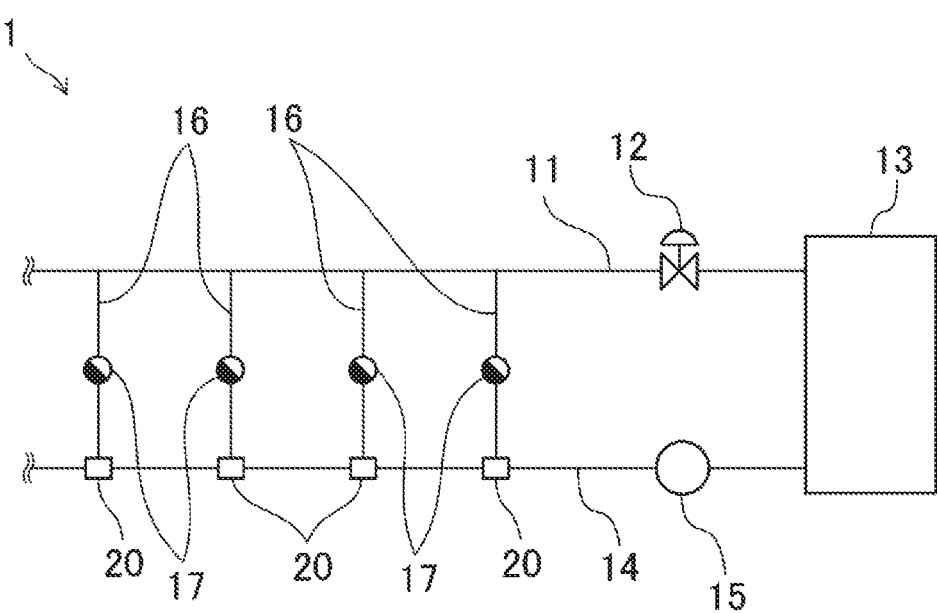
FIG. 1 is a plumbing diagram of an outline configuration of a drain recovery system according to an embodiment.

A drain recovery system 1 of the present embodiment heats a target object by steam, and recovers drain generated by such heating. As illustrated in FIG. 1, the drain recovery system 1 includes a steam supply pipe 11, a steam using instrument 13, a drain recovery pipe 14, multiple drain discharge pipes 16, and silencers 20 according to the claims of the present application.

The steam supply pipe 11 is connected to the steam using instrument 13. The steam supply pipe 11 is, for example, connected to boiler equipment (not shown), and the steam generated by the boiler equipment is supplied to the steam using instrument 13. A pressure reduction valve 12 configured to adjust a steam pressure is provided at the steam supply pipe 11. The steam using instrument 13 is, for example, a heat exchanger, and condenses the steam supplied from the steam supply pipe 11 by heat radiation of the steam to the target object to heat the target object. The steam is condensed into the drain (steam condensate). That is, in the steam using instrument 13, latent heat of condensation of the steam is provided to the target object, and the target object is heated with the latent heat.

The drain recovery pipe 14 is connected to the steam using instrument 13. In the drain recovery pipe 14, the drain generated due to condensation of the steam in the steam using instrument 13 is recovered. A liquid pumping device 15 is provided at the drain recovery pipe 14. The liquid pumping device 15 is a pump configured to pump the drain generated in the steam using instrument 13 to a downstream side through the drain recovery pipe 14. For example, the drain of the steam using instrument 13 flows into the liquid pumping device 15 through the drain recovery pipe 14, and is temporarily stored in the liquid pumping device 15. When the amount of stored drain reaches a predetermined amount, high-pressure operating gas is introduced into the liquid pumping device 15, and the stored drain is pumped to the downstream side by the pressure of the operating gas. When the drain is pumped, the drain flows into the liquid pumping device 15 from the steam using instrument 13 again, and is stored in the liquid pumping device 15. In this manner, inflow of the drain and pumping (discharging) of the drain are alternately performed in the liquid pumping device 15.

The multiple drain discharge pipes 16 are connected to between the steam supply pipe 11 and the drain recovery pipe 14. Specifically, upstream ends of the drain discharge pipes 16 are connected to the steam supply pipe 11, and downstream ends of the drain discharge pipes 16 are connected to the drain recovery pipe 14 through the silencers 20. The multiple drain discharge pipes 16 are provided at intervals (e.g., 20 to 30 m). The drain discharge pipe 16 is for causing the drain generated in the steam supply pipe 11 to flow into the drain recovery pipe 14. That is, part of the steam might be condensed into the drain in the steam supply pipe 11 in some cases, and such drain is recovered by the drain recovery pipe 14 through the drain discharge pipes 16 and the silencers 20.

A steam trap 17 is provided in the middle of each drain discharge pipe 16. The drain generated in the steam supply pipe 11 flows into the steam traps 17 through the drain discharge pipes 16. The steam trap 17 is for automatically discharging only the inflow drain to the downstream side by an upstream-downstream pressure difference (a difference between a pressure on an upstream side and a pressure on the downstream side). Note that the drain mixed with the steam actually flows into the steam trap 17. In this manner, the drain generated in the steam supply pipe 11 joins, at the drain recovery pipe 14, the drain generated in the steam using instrument 13, and then, is pumped to the downstream side. Note that the drain recovery pipe 14 is positioned below the steam supply pipe 11, and the drain discharge pipes 16 extend up and down and are connected to an upper portion of the drain recovery pipe 14.

Configuration of Silencer

Figure 2:
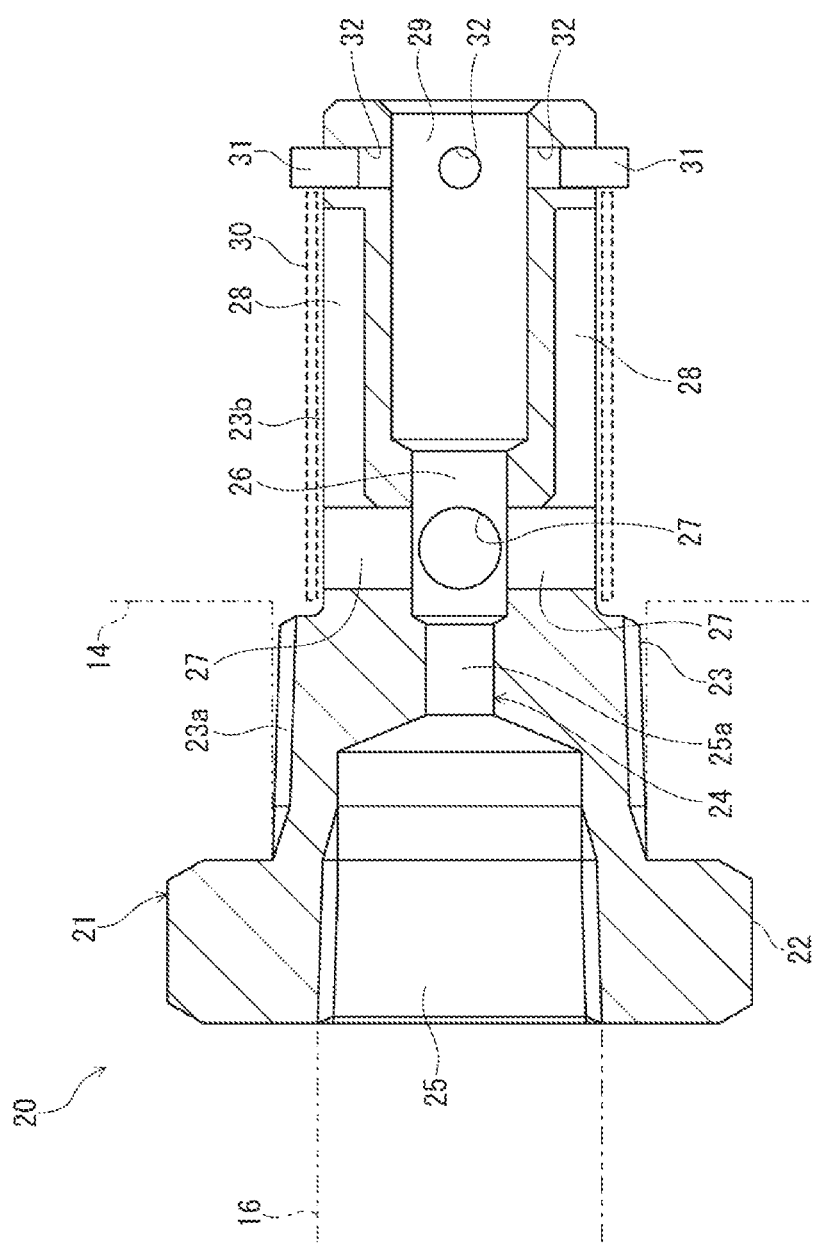
FIG. 2 is a sectional view of an outline configuration of a silencer according to the embodiment.
Figure 3:
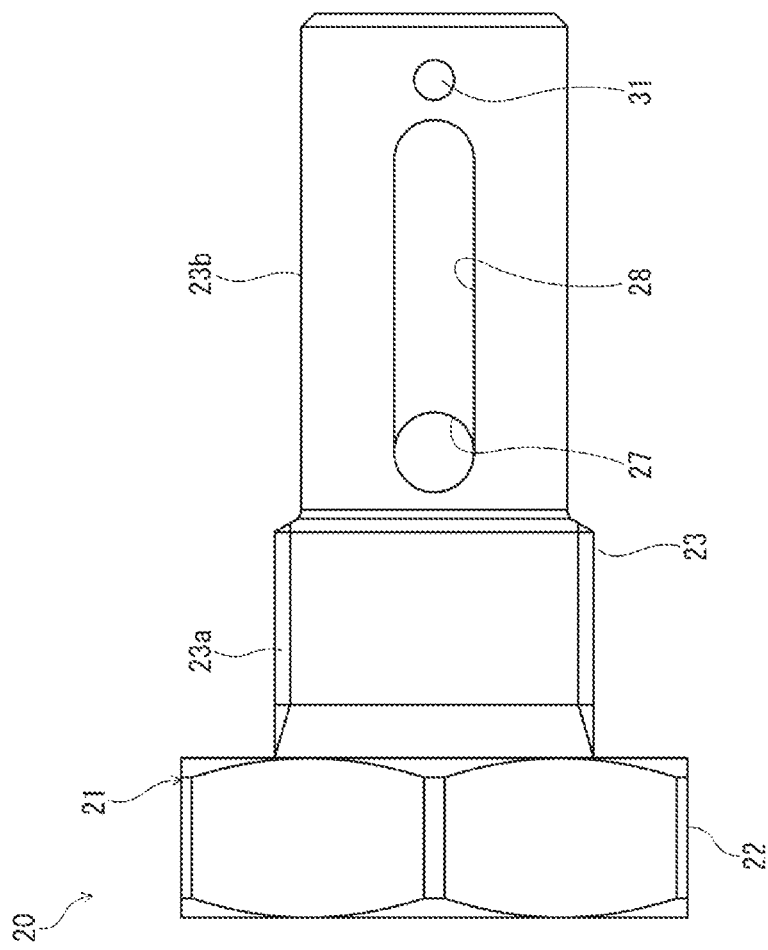
FIG. 3 is a front view of the outline configuration of the silencer according to the embodiment with a porous member being omitted.

Each silencer 20 is provided at a connection portion between the drain recovery pipe 14 and the drain discharge pipe 16. The silencer 20 is for causing the steam to contact the drain in the silencer 20. As illustrated in FIGS. 2 and 3, the silencer 20 includes a main body 21 and a porous member 30. In FIGS. 2 and 3, the left side is the upstream side, and the right side is the downstream side.

The main body 21 has a head portion 22 and a shaft portion 23. The head portion 22 is formed in a flat substantially-hexagonal columnar shape. The shaft portion 23 is formed continuously to the downstream side of the head portion 22, and extends in an upstream-to-downstream direction. The shaft portion 23 is formed in a circular columnar shape concentric with the head portion 22. A thread portion 23a to be screwed with the drain recovery pipe 14 is formed at an outer peripheral surface of the shaft portion 23 on the upstream side. The thread portion 23a of the shaft portion 23 is screwed with the drain recovery pipe 14, and accordingly, the main body 21 is connected to the drain recovery pipe 14. Moreover, a downstream portion of the shaft portion 23 with respect to the thread portion 23a is formed as a submerged portion 23b. The submerged portion 23b is a portion submerged in the drain flowing in the drain recovery pipe 14 when the main body 21 is connected to the drain recovery pipe 14.

A flow path 24 for the drain and the steam is formed at the main body 21. The flow path 24 has an inlet port 25, a mixing portion 26, communication paths 27, and outlet ports 28. The inlet port 25 opens at an upstream side surface of the head portion 22, and extends in an axial direction (i.e., the upstream-to-downstream direction) of the shaft portion 23. The inlet port 25 is formed across the head portion 22 and the shaft portion 23. That is, the inlet port 25 is provided at a portion of the main body 21 other than the submerged portion 23b. The drain discharge pipe 16 is connected to the inlet port 25. A nozzle portion 25a configured to spray the steam to the mixing portion 26 is provided at the inlet port 25. At the inlet port 25, the inner diameter of the nozzle portion 25a is smaller than those of other portions.

The mixing portion 26, the communication paths 27, and the outlet ports 28 are provided at the submerged portion 23b of the shaft portion 23. The mixing portion 26 is provided at the center of the submerged portion 23b in a radial direction thereof, and is formed in a circular columnar shape concentric with the shaft portion 23 (the submerged portion 23b). The mixing portion 26 communicates with the nozzle portion 25a of the inlet port 25. The outlet ports 28 open at an outer peripheral surface of the submerged portion 23b, and the multiple (four in the present embodiment) outlet ports 28 are provided in a circumferential direction of the submerged portion 23b. The outlet port 28 is formed in an elongated substantially-rectangular shape extending in the axial direction of the shaft portion 23 (the submerged portion 23b). End portions (right and left end portions in FIG. 3) of the outlet port 28 in an axial direction thereof are formed in an arc shape. The length of the outlet port 28 in the axial direction thereof is longer than the length of the mixing portion 26 in an axial direction thereof.

The same number (four) of communication paths 27 as the number of outlet ports 28 are provided. The communication path 27 is for causing the mixing portion 26 and the outlet port 28 to communicate with each other. The communication paths 27 extend from the mixing portion 26 in the radial direction of the submerged portion 23b, and are connected to the outlet ports 28. The communication paths 27 are connected to upstream end portions of the outlet ports 28 as the end portions of the outlet ports 28 in the axial direction thereof. Moreover, a communication path 29 causing the mixing portion 26 and the outside to communicate with each other is formed at the submerged portion 23b. The communication path 29 is a linear flow path extending in the axial direction of the shaft portion 23, and is provided at the center of the submerged portion 23b in the radial direction thereof. That is, the communication path 29 extends from the mixing portion 26 in a downstream direction, and opens at a downstream end surface of the submerged portion 23b (the shaft portion 23). The communication path 29 has a slightly-larger inner diameter than that of the mixing portion 26.

The submerged portion 23b is submerged in the drain of the drain recovery pipe 14, and therefore, through the outlet ports 28, the drain of the drain recovery pipe 14 flows into the mixing portion 26, the communication paths 27, the outlet ports 28, and the communication path 29 provided at the submerged portion 23b. Moreover, the drain of the drain recovery pipe 14 directly flows into the communication path 29. In the flow path 24, the mixing portion 26, the communication paths 27, the outlet ports 28, and the communication path 29 are drain present portions where the drain of the drain recovery pipe 14 is present. The drain present portion is a portion where the steam having flowed in through the inlet port 25 contacts the drain of the drain recovery pipe 14.

The porous member 30 is formed in a cylindrical shape, and is provided at the outer periphery of the submerged portion 23b of the shaft portion 23. The porous member 30 covers the outlet ports 28. The porous member 30 allows the drain and the steam to flow out of the outlet ports 28. Moreover, the porous member 30 allows external drain, i.e., the drain of the drain recovery pipe 14, to flow into the outlet ports 28. Pins 31 configured to prevent detachment of the porous member 30 from the submerged portion 23b are provided at the submerged portion 23b. The multiple (four in the present embodiment) pins 31 are provided at the outer periphery of the submerged portion 23b, and are press-fitted in insertion holes 32 formed at the outer peripheral surface of the submerged portion 23b.

The porous member 30 is a member having many small holes allowing circulation of the drain and the steam. For example, a metal mesh, punching metal, expanded metal, or a thin wire sintered body is used as the porous member 30.

Operation in the silencer 20 configured as described above will be described. High-temperature drain discharged from the steam trap 17 flows in through the inlet port 25, and is mixed with low-temperature drain of the drain recovery pipe 14 at the mixing portion 26. The drain mixture flows into the outlet ports 28 through the communication paths 27, and flows out to the drain recovery pipe 14 through the porous member 30. In this manner, the drain generated in the steam supply pipe 11 is recovered by the drain recovery pipe 14.

In some cases, part of the drain discharged from the steam trap 17 might be re-evaporated into steam (flash steam). This is because the drain flowing into the steam trap 17 from the steam supply pipe 11 is at high temperature and a pressure drop is caused due to discharging of such high-temperature drain from the steam trap 17. The re-evaporated steam flows into the silencer 20.

In the silencer 20, the steam having flowed into the inlet port 25 is sprayed from the nozzle portion 25a to the mixing portion 26. The sprayed steam comes into contact with the low-temperature drain present in the mixing portion 26, and then, is condensed. When the amount of steam flowing into the silencer 20 from the drain discharge pipe 16 is small, all or almost all of the steam is condensed in the mixing portion 26. Moreover, the steam is dispersively sprayed from the nozzle portion 25a. Thus, the area of contact between the steam and the low-temperature drain increases in the mixing portion 26, and therefore, a steam condensation effect is accelerated. The drain generated by steam condensation flows into the outlet ports 28 through the communication paths 27, and flows out to the drain recovery pipe 14 through the porous member 30.

When the amount of steam flowing into the silencer 20 from the drain discharge pipe 16 increases, part of the steam fails to be condensed in the mixing portion 26. The steam not condensed in the mixing portion 26 flows into the outlet ports 28 through the communication paths 27. The length of the outlet port 28 is longer than that of the mixing portion 26, and the low-temperature drain of the drain recovery pipe 14 is present closer to the outlet port 28 than the drain is to the mixing portion 26. Thus, the area of contact between the steam and the low-temperature drain increases. Consequently, the steam flowing into the outlet ports 28 without being condensed can be condensed. Note that the steam also contacts the low-temperature drain when flowing from the mixing portion 26 to the outlet ports 28, and therefore, is also condensed.

Moreover, the steam of the mixing portion 26 flows into the multiple outlet ports 28, and therefore, is dispersed and flows into the outlet ports 28. Thus, the amount of steam in each outlet port 28 decreases, and therefore, the steam condensation effect is more accelerated.

Note that the total flow path cross-sectional area of the multiple communication paths 27 is larger than the flow path cross-sectional area of the communication path 29. Thus, the drain and the steam having flowed into the mixing portion 26 preferentially flow into the communication paths 27, and the remaining drain and steam flow into the communication path 29.

In a case where the steam not condensed in the outlet ports 28 is caused, such steam flows out to the drain recovery pipe 14 through the porous member 30. When passing through the porous member 30, the steam is finely dispersed. The steam is finely dispersed so that the area of contact between the steam and the low-temperature drain can be earned. Thus, the steam condensation effect is accelerated. In addition, the low-temperature drain is present outside the porous member 30, and therefore, the steam finely dispersed by the porous member 30 promptly contacts the low-temperature and is condensed. That is, the steam is condensed into the drain at the substantially same time as passage through the porous member 30. Thus, a small amount of steam flows out to the drain recovery pipe 14 from the silencer 20.

Even if the steam fails to be condensed when passing through the porous member 30, such steam is finely dispersed and flows into the drain recovery pipe 14. As described above, the steam is finely dispersed by the silencer 20 and flows into the drain recovery pipe 14, and therefore, impact (water hammer) caused in the drain recovery pipe 14 is reduced.

If the steam flows into the drain recovery pipe 14 without being dispersed, a relatively-large mass (space) of steam is formed in the drain recovery pipe 14 due to steam inflow. Such a steam mass is cooled by the surrounding low-temperature drain, and is rapidly condensed. Thus, the space where the steam is present is brought into a vacuum state at once. The surrounding drain flows into such a vacuum space at once, and due to drain collision or collision of the drain with a pipe wall of the drain recovery pipe 14, the impact (the water hammer) is caused.

In the present embodiment, the steam is finely dispersed by the silencer 20, and flows into the drain recovery pipe 14. Thus, the great steam mass (space) is less formed in the drain recovery pipe 14. Consequently, the vacuum space caused due to rapid steam condensation is small. As a result, occurrence of great water hammer leading to noise and pipe damage is reduced. That is, the magnitude of water hammer decreases.

As described above, the silencer 20 of the above-described embodiment includes the main body 21 provided with the flow path 24 having the steam inlet port 25 and the outlet ports 28. The main body 21 has the submerged portion 23b configured such that the outlet ports 28 are submerged in the drain and the steam contacts, in the flow path 24, the present drain having flowed in through the outlet ports 28. Moreover, the silencer 20 includes the porous member 30 covering the outlet ports 28.

According to the above-described configuration, the steam comes into contact with the drain in the flow path 24 provided at the submerged portion 23b, and therefore, can be condensed. Thus, the steam decreases. Moreover, in a case where the steam fails to be condensed, such steam can be finely dispersed by the porous member 30. Thus, the steam can dispersively flow out to the drain recovery pipe 14 in which the low-temperature drain flows. With this configuration, formation of the great steam mass (space) in the drain recovery pipe 14 can be reduced. Thus, in the drain recovery pipe 14, occurrence of the water hammer due to rapid condensation of the steam mass can be reduced, or the magnitude of water hammer can be decreased. Consequently, noise and pipe damage due to the water hammer can be reduced.

Moreover, in the silencer 20 of the above-described embodiment, the multiple outlet ports 28 are provided at the submerged portion 23b. Further, the flow path 24 has the mixing portion 26 and the multiple communication paths 27. The mixing portion 26 is provided at the submerged portion 23b, and communicates with the inlet port 25. In the mixing portion 26, the steam is mixed with the drain. The communication paths 27 are provided at the submerged portion 23b, and cause the mixing portion 26 and the multiple outlet ports 28 to communicate with each other.

According to the above-described configuration, the steam having flowed into the mixing portion 26 through the inlet port 25 flows into the multiple outlet ports 28 through the multiple communication paths 27. Thus, the steam can dispersively flow into the outlet ports 28 from the mixing portion 26. Consequently, the amount of steam in each outlet port 28 decreases, and therefore, the steam condensation effect can be accelerated. With this configuration, the amount of steam flowing out to the drain recovery pipe 14 from the silencer 20 can be reduced.

Further, in the silencer 20 of the above-described embodiment, the submerged portion 23b is formed in a circular columnar shape. Moreover, the multiple outlet ports 28 are arranged in the circumferential direction of the submerged portion 23b, and opens at the outer peripheral surface of the submerged portion 23b. According to this configuration, the steam can evenly contact, in the outlet ports 28, the low-temperature drain present outside the submerged portion 23b. Thus, the steam condensation effect can be accelerated.

In addition, in the silencer 20 of the above-described embodiment, the outlet ports 28 are formed in an elongated shape extending in the axial direction of the submerged portion 23b. Thus, the opening area of the outlet ports 28 at the circular columnar submerged portion 23b can be earned. With this configuration, a region where the steam and the low-temperature drain contact each other, i.e., a steam condensation region, can be increased, and therefore, the steam condensation effect can be accelerated.

Moreover, in the silencer 20 of the above-described embodiment, the mixing portion 26 is provided at the center of the submerged portion 23b in the radial direction thereof, and the communication paths 27 are connected to the mixing portion 26 and the end portions of the outlet ports 28 in the axial direction thereof. According to this configuration, the steam flow path length of the submerged portion 23b can be earned. Thus, the region where the steam and the low-temperature drain contact each other can be increased, and therefore, the steam condensation effect can be accelerated.

Further, in the silencer 20 of the above-described embodiment, the inlet port 25 is provided at a portion of the main body 21 other than the submerged portion 23b, and has the nozzle portion 25a configured to spray the steam to the mixing portion 26. According to this configuration, the steam is dispersively sprayed by the nozzle portion 25a. Thus, the area of contact between the steam and the low-temperature drain in the mixing portion 26 can be increased, and the steam condensation effect can be accelerated.

Other Embodiments

The technique disclosed in the present application may have the following configurations in the above-described embodiment. For example, in the above-described embodiment, the single outlet port 28 and the single communication path 27 may be provided.

Moreover, the nozzle portion 25a may be omitted from the inlet port 25.

The technique disclosed in the present application is useful for a silencer configured to cause steam to contact drain.

What is claimed:

1. A silencer comprising:
a main body provided with a flow path having inlet and outlet ports of steam and including a submerged portion configured such that the outlet port is submerged in a drain fluid flowing in a drain recovery pipe and the steam contacts, in the flow path, the present drain fluid having flowed in through the outlet port; and
a porous member covering the outlet port; wherein
the outlet port includes multiple outlet ports provided at the submerged portion, and
the flow path includes
a mixing portion provided at the submerged portion, communicating with the inlet port, and configured such that the steam is mixed with the drain fluid, and
multiple communication paths provided at the submerged portion and causing the mixing portion and the multiple outlet ports to communicate with each other.

2. The silencer according to claim 1, wherein
the submerged portion is formed in a circular columnar shape, and
the multiple outlet ports are arranged in a circumferential direction of the submerged portion, and open at an outer peripheral surface of the submerged portion.

3. The silencer according to claim 2, wherein
each outlet port is formed in an elongated shape extending in an axial direction of the submerged portion.

4. The silencer according to claim 3, wherein
the mixing portion is provided at a center of the submerged portion in a radial direction thereof, and
each communication path is connected to the mixing portion and an end portion of a corresponding one of the outlet ports in an axial direction thereof.

5. The silencer according to claim 1, wherein
the inlet port has a nozzle portion provided at other portions of the main body than the submerged portion and configured to spray the steam to the mixing portion.

* * * * *